United States Patent Office 3,507,173
Patented Apr. 21, 1970

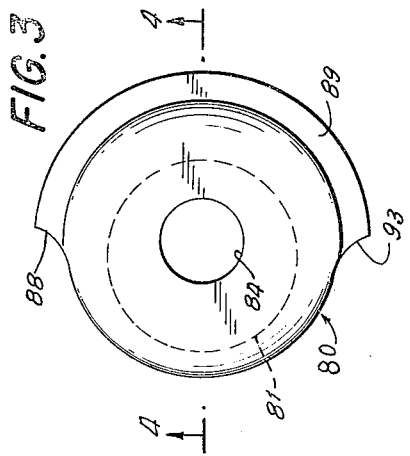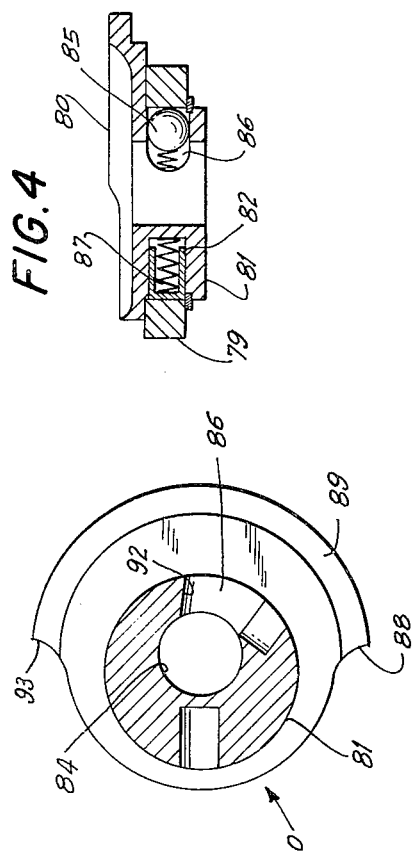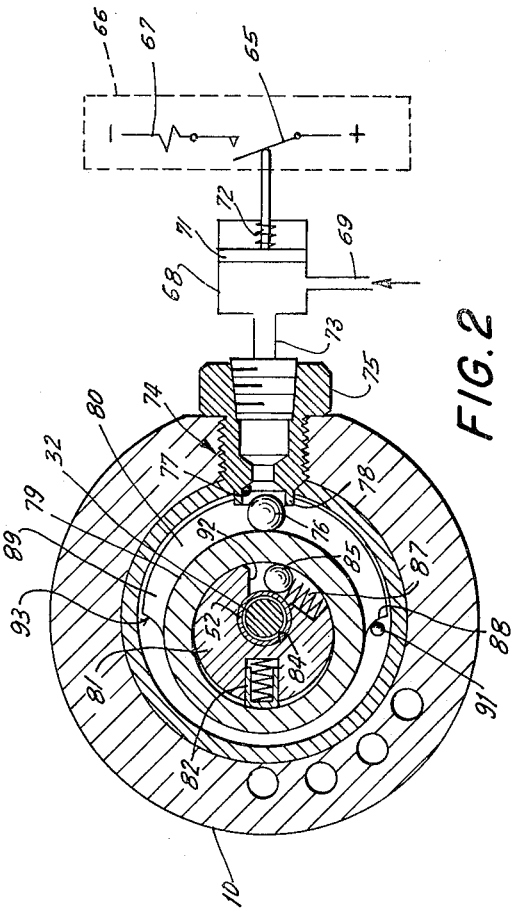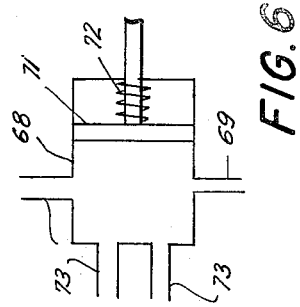

3,507,173
TWO-SPEED NUT-RUNNER HAVING TWO AIR MOTORS ACTING AS MAIN AND AUXILIARY DRIVERS OF A DUAL-DRIVE PLANETARY GEAR SYSTEM
William K. Wallace, Barneveld, N.Y., assignor to Chicago Pneumatic Tool Company, New York, N.Y., a corporation of New Jersey
Filed July 19, 1968, Ser. No. 746,099
Int. Cl. B25b 21/02; F16h 37/06
U.S. Cl. 81—52.4                                           6 Claims

ABSTRACT OF THE DISCLOSURE

A nut-running tool having an initial running-up phase and a final torquing phase accomplished by means of a pair of rotary air motors acting as main and auxiliary drivers of a dual-drive planetary gear system. The motors are caused to be pneumatically operated concurrently and in the same direction. The main motor is coupled to the work through less gear reduction than the auxiliary motor so that the work is rapidly run down by the main motor to the limits of its capacity, which will be when the torque built up in the work is about half of the required final torque. The main motor then stalls, and the auxiliary motor takes over to run the work down to a final degree of tightness. The stalled motor acts during the final tightening phase to hold stationary a ring gear of the dual-drive planetary gear system, permitting the auxiliary motor to drive through the gear system to the work. The torque delivered by the auxiliary motor continues until the torque built up in the work corresponds to the limit of the holding capacity of the main motor upon the ring gear of the dual-drive planetary gear system. When this occurs, the main motor will be forced to rotate backwards by the auxiliary motor.

At about the time that the main motor starts to rotate backwards, a final torque value is delivered by the auxiliary motor, after which the work does not experience any further torque increase. The directional change of rotation of the main motor is used to cause actuation of control mechanism to shut off operating air to the tool after delivery of final torque has occurred. The value of final torque delivery can be varied by changing the pressure of operating air supplied to the main motor.

BACKGROUND OF THE INVENTION

This invention relates to the art of two-speed torque controlled nut-runners driven by rotary air motors.

Nut-runners of this general nature are known as having a single air driven rotary motor which operates through release clutch arrangements to cause the tool to run through an initial phase of partially tightening the work, and through a subsequent phase of finally tightening the work.

The general objective of the invention is to provide a two-speed nut-runner which does not require release clutches for it to pass through multiple stages of torque delivery. This is accomplished by utilizing a pair of rotary air motors as main and auxiliary drivers of a dual-drive planetary gear system. These are coupled to one another and to an output spindle by means of differential gearing; and both motors are arranged to be pneumatically operated in the same direction of rotation. The main motor provides high speed and low torque to initially run down and tighten the nut to approximately half of the final torque value, and then stalls. The auxiliary motor, however, continues operating to delivery torque to the work. When the torque applied to the work builds up to a value equal to the holding capacity of the main motor, the auxiliary motor automatically forces the main motor to rotate backwards. Final torque is delivered to the work at about the time the main motor starts to rotate backwards. The auxiliary motor continues thereafter to drive the main motor backwards, exerting as it does so a value of torque on the work equal to the final torque value, until operation of the tool is finally terminated.

A desirable advantage of the tool of the present invention is that it eliminates the effects of inertia on torque control. Since the main motor stalls at about half the final torque value, the addition of the inertia torque of the main motor will still be below the final torque value applied to the work by the auxiliary motor.

A further advantage is that it provides recovery torque. Following delivery of a pre-determined maximum torque, the auxiliary motor drives the main motor backwards, which means that each blade of the main motor exerts a torque value equal to the final torque of the work as the blade goes through its normal excursion from the exhaust port to the inlet port.

Another advantage is that it permits easy torque adjustment since the value of the final torque delivered to the work can be reset by changing the operating air pressure applied to the main motor.

Another feature of the invention is control mechanism with which the main motor cooperates upon changing its direction of rotation to cause interruption of further operation of the tool.

BRIEF DESCRIPTION OF THE DRAWING

In the accompanying drawings:

FIG. 2 is a cross section on line 2—2 of FIG. 1;

FIG. 3 is a detail of the front face of the driving member of the slip clutch;

FIG. 4 is a section on line 4—4 of FIG. 3, but with the ring element and other components of the clutch added;

FIG. 5 is a detail of the rear face of the driving clutch member, but showing the body portion in section; and FIG. 6 is a schematic view showing the pressure control chamber in a form having multiple outlets for control of a multiple number of connected nut-runners.

DETAILED DESCRIPTION OF A PREFERRED EMBODIMENT

Figure 1:
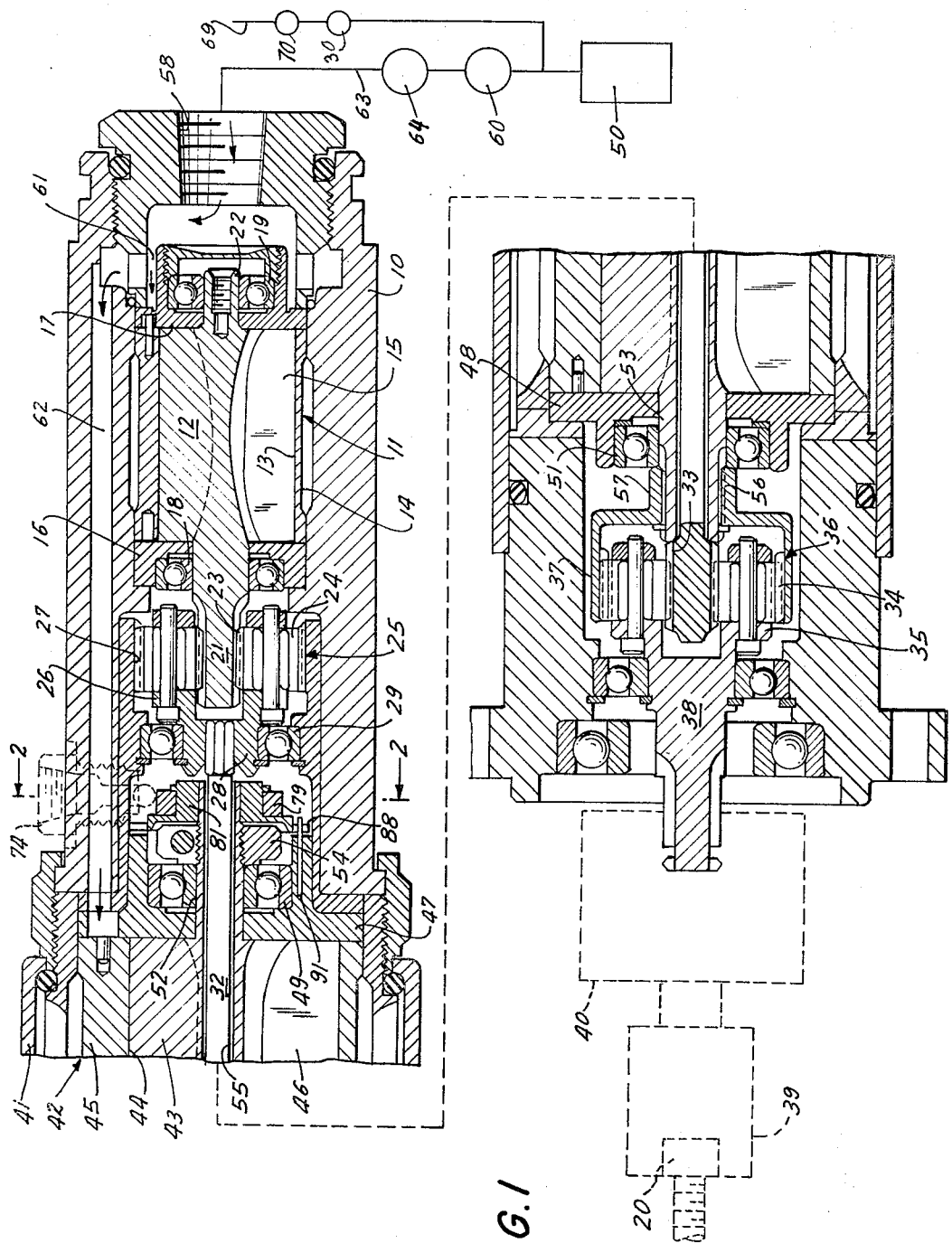
FIG. 1 is a longitudinal section through a two-speed nut-runner embodying the invention.

The illustrated tool includes a general housing 10 defined by a succession of sections rigidly connected to one another in end-to-end relation.

Supported in a rear section of the housing is an air driven auxiliary motor 11 of a conventional radially slidable vane type. It includes a rotor 12 eccentrically arranged in a chamber 13 defined by a surrounding stationary liner 14. Radially slidable in the rotor are air driven vanes 15 which sweep the surrounding wall of the liner as the rotor rotates. Chamber 13 is closed at its ends by means of the usual stationary end plates 16 and 17 which are fitted with bearings 18 and 19. The rotor is supported for rotation in its chamber by means of opposed shaft ends 21 and 22 respectively journaled in the bearings 18 and 19. The forward shaft end 21 projects beyond its bearing 18; and is formed with a pinion which is drivingly engaged at 23 with a group of planetary or idler gears 24 of a first stage of reduction gearing 25. The idler gears are carried by a spindle cage 26 and are in toothed engagement with a surrounding stationary ring gear 27 so as to transmit rotation of the rotor to an output spindle part 28 of the spindle cage. The spindle is journaled in a bearing 29 and it has an internal splined driving connection with the rear end of an elongated torque transmitting shaft 32. The latter extends axially of the tool.

Shaft 32 has a sun gear 33 at its forward end drivingly engaged with planetary or idler gears 34 carried by a spindle cage 35 of a dual-drive planetary gear system 36. The gears 34 have toothed engagement with a surrounding rotatable main ring gear 37; and are rotatable relative to the ring gear so as to transmit rotation of shaft 32 to a carrier arm spindle 38 of the spindle cage 35. Shaft 32 is operable by the auxiliary motor 11 to deliver torque to the carrier arm spindle 38. The latter spindle is connectible by means of a terminal socket 39 with the work, such as a nut 20 or other threaded fastener. Additional reduction gearing, schematically indicated at 40, may be interposed between the socket and the spindle 38.

Supported in an intermediate section 41 of the housing is an air driven main motor 42 of a conventional radially slidable blade type. It includes a rotor 43 which is eccentrically arranged in a chamber 44 defined by a stationary surrounding liner 45. Radially sliadable in the rotor are air driven vanes 46 which sweep the wall of the liner 45 as the rotor rotates. Chamber 44 is closed at its ends by means of stationary end plates 47 and 48 which are fitted with bearings 49 and 51. The rotor is supported for rotation in its chamber by means of shaft ends 52 and 53 respectively journaled in bearings 49 and 51. A lock-nut 54 secured upon the rotor shaft end 52 abuts bearing 49. The rotor has an axial bore 55 which opens through both of its shaft ends. The torque transmitting shaft 32 extends axially through the bore for rotation relative to the rotor 43 of the main motor 42. The forward shaft end 53 of the rotor 43 is formed with a pinion 56, the teeth of which are drivingly engaged with complementary teeth provided internally of a reduced axially extending stem or hub portion 57 of the main ring gear 37. The latter gear is rotatable with the main motor 42 so as to transmit relatively low torque at high speed through the planetary gears 34 of the dual-drive planetary gear system 36 to the carrier arm spindle 38.

An inlet passage 58, provided by a bushing fitted in the rear end of the housing 10, is connectible to an external source 50 of pressure air. A passage 61 leads from the inlet passage to the chamber 13 of the auxiliary motor 11; and a branch passage 62 leads from the inlet passage through the housing wall to the chamber 44 of the main motor 42.

In summary of the operation of the tool, the socket end 39 of the tool is engaged with the work, such as the nut 20, preparatory to running the latter down to a predetermined degree of tightness. Live air admitted through a suitable control valve 60 in the supply line 63 from the source 50 to the inlet passage 58 flows through the connecting passages 61 and 62 to drive the rotors of both motors concurrently in a clockwise or forward direction. The auxiliary motor 11 transmits its rotation through the reduction gearing 25, shaft 32 and the dual-drive planetary gear system 36 to the carrier arm spindle 38. The main motor 42 transmits its rotation through the main ring gear 37 and idler gears 34 of the dual-drive planetary gear system 36 to the carrier arm spindle 38. Due to the value of the two stages 25 and 36 of reduction gearing, the power and speed of rotation being transmitted to the work by the auxiliary motor is relatively less than that being transmitted by the main motor so that the faster driving main motor 42 operates during an initial phase to rapidly run down and partially tighten the work. The main motor tightens the work to the limits of its capacity, and then stalls. This will occur when the torque delivered reaches approximately half of that required to finally tighten the work.

Upon stalling of the main motor, the auxiliary motor 11 continues to deliver at a relatively slower speed a higher torque to the work until the work is run down to a predetermined final or maximum degree of tightness. During this final phase of tightening the work, the main motor 42 in its stalled condition holds the ring gear 37 stationary, permitting the auxiliary motor to drive through the shaft 32, the idler gears 34, and the carrier arm spindle 38 to the work.

As final torque is delivered to the work, further torque delivery by the auxiliary motor acts through the idler gears 34 and the main ring gear 37 to rotate the main motor 42 backwards. Final torque value is delivered to the work by the auxiliary motor at about the time the main motor starts to rotate backwards. In explanation of this action, it is known that the output stall torque of an air motor is approximately half as much as the torque required to rotate the motor backwards against the stall torque. Since the main ring gear 37 of the dual-drive planetary gear system 36 is splined to the rotor 43 of the main motor, the maximum torque delivered to the work by the auxiliary motor cannot exceed the capacity of the main motor to resist the torque reaction. Accordingly, since the torque being delivered by the auxiliary motor to the dual-drive planetary gear system 36 after final tightening of the work exceeds this capacity, the torque then delivered by the auxiliary motor acts through the idler gears 34 and the main ring gear 37 to force the main motor to rotate backwards or in a reverse direction. In this respect, each blade 46 of the main motor exerts a resisting torque value equal to the final torque applied to the work as the blade goes through its normal excursion from the usual exhaust port to the inlet port of the motor.

The fact that final torque has been delivered to the work is indicated externally of the tool to the operator by a stationary or stalled condition of the socket 39.

The value of final torque delivered to the work can be regulated by changing the pressure of the operating air flowing to the main motor by means of an adjustable pressure regulator 64 interposed in the supply line 63.

The directional change of rotation of the main motor may be used, as it is here, to close a control switch 65 (FIG. 2) in a signal device or electrical circuit 66 to energize a solenoid 67 to close the valve 60 in the supply line 63 so as to shut off operating air to the tool. The mechanism, generally indicated at 93 in FIG. 2, to effect this action includes a pressure chamber 68 connected by a restricted flow line 69 to the pressure air source 50. When air pressure of a certain degree is caused to build up in chamber 68, it forces a plunger 71 against the bias of its return spring 72 to actuate the switch 65 to closed condition. During the time the main motor is rotating in a forward direction and prior to its directional change of rotation, pressure air entering chamber 68 is unable to build up to actuate the plunger, since the entering pressure air is normally being vented through a valve unit 74 over a passage 73 of larger diameter than the line 69.

The valve unit 74 includes a bushing or fitting 75 extending through the side wall of the housing 10 into the interior of the latter. A ball valve 76 is operable relative to a valve seat 77 in the bushing. In its open condition, as in FIG. 2, the ball valve normally floats within the confines of an annular skirt wall 78 of the bushing between the seat 77 and the opposed surface of a ring 79. The ring surrounds and is of slightly larger diameter than the cylindrical body 81 of a slip-clutch driving member 80, the slip-clutch being defined by the ring 79 and the member 80. A plunger 82, operating in a radial bore of the clutch body 81, is pressed by its spring load against the inner diameter surface of the ring so as to frictionally engage the latter with the clutch body 81. The clutch body has an eccentrically located bore 84, the inner wall of which surrounds the end of the shaft 52 of the main motor. A clutch ball 85 operating in an open-ended slot 86, formed in the clutch body between the rotor shaft 52 and the ring 79, is biased by a spring 87 into contact with the opposed surfaces of the ring and the rotor shaft 52.

In the operation of the control mechanism 93, assuming the shaft 52 is rotating in a clockwise direction delivering torque to the work, the control mechanism will at this time have a condition as in FIG. 2. In this condition, a shoulder 88 of a semi-circular flange 89 on the clutch body 81 abuts a stationary stop pin 91 and thus restrains the clutch body 81 together with the ring 79 frictionally engaged thereto from rotating in a clockwise direction. At this time, the clutch ball 85 will have the position as in FIG. 2 wherein it will be biased by the light spring 87 into contact with opposed surfaces of the ring 79 and shaft 52. In this position of the clutch ball, the eccentric diameter of the clutch body 81 prevents the force of the spring loaded plunger 82 from acting on the clutch ball so that the light frictional drag created on shaft 52 by the bias of the spring 87 on the clutch ball is ineffective to prevent clockwise rotation of the shaft 52 relative to the clutch body. While the shaft 52 is thus rotating in a clockwise direction, the low end of the eccentric defined by the clutch body 81 and ring 79 is sufficiently positioned from the ball valve seat 77 so as to allow air entering the pressure chamber 68 to vent around the unseated ball valve 85 and flow through the interior of the housing 10 to atmosphere.

When the rotor shaft 52 stalls with the main motor 42, as earlier explained, following the initial partial tightening of the work, the valve unit 74 remains in open condition, as in FIG. 2, allowing air to vent from the chamber 68 around the ball valve 76. At about the time final torque is delivered by the auxiliary motor 11 to the work, the rotor shaft 52 starts to rotate backwards in a reverse or counterclockwise direction with the main motor 42, as earlier explained. The reverse rotation of shaft 52 causes the clutch ball 85 to be rolled against the wall area 92 of slot 86 into a locking position between the ring 79 and shaft 52 subject to the load of the plunger 82. Shaft 52 thus becomes frictionally engaged with the clutch body 81 and ring 79, and carries them around with it. In this action, the shoulder 88 will be carried away from the stop pin 91; and the high end of the eccentric defined by the clutch body 81 and ring 79 will eventually be carried over the ball valve 76 to cam it closed upon its seat. This blocks venting of air from the pressure chamber 68, and thus enables air pressure to build up in the latter. The cammed condition of the ring 79 with the ball valve prevents further counter-clockwise rotation of the ring and clutch body with shaft 52. In this respect, as the ring 79 obtains the cammed condition, it forces the plunger 82 into its bore, and shaft 52 continues rotating in the counterclockwise direction relative to the stopped ring and clutch body, slipping as it does so relative to the clutch ball. Shaft 52 continues this relative rotation until the pressure in chamber 68 builds up sufficiently to actuate the switch 65 to shut off further flow of operating air to the tool.

It is noted from FIG. 2 that it is only necessary for the ring 72 to be carried counterclockwise from the position wherein the ball valve 76 is in open condition for an angular distance of about 180° to cam the ball valve closed upon its seat. A brief time is then required for pressure to build up in chamber 68 to actuate the switch 65. By means of this arrangement, operating air to the tool is not immediately shut off at the start of the reverse rotation of the main motor and sufficient time is caused to elapse to make certain that final torque has been delivered to the work before the operating air has been shut off.

At the start of the next cycle of the tool, after trapped pressure air has been relieved in suitable manner from chamber 68 so as to allow the switch 65 to re-open, the ball valve 76 will nevertheless still be held cammed by ring 79 in closed condition and the clutch ball 85 will still be in its locking position against the wall area 92 subject to the forces of the plunger 82 and the spring 87. As shaft 52 rotates clockwise, it will be frictionally engaged by the clutch ball 85 with the ring 79 and clutch body 81 so as to carry them about with it causing the ball valve 76 to become unseated. The frictional drive continues until the shoulder 88 of the clutch body 81 engages the pin 91, preventing further rotation of the clutch body and ring. Shaft 52, however, continues rotating clockwise relative to the clutch body and ring as it causes the clutch ball to be rolled out of its locking position from the wall area 92 to the position shown in FIG. 2 free of the force of the spring loaded plunger 82.

The pressure chamber 68 may be made common to a plurality of nut-running tools, the valve unit 74 of each of which would be connected by means of a separate vent line 73 to the pressure chamber 68, as appears in FIG. 6. The pressure chamber 68 would in this instance be vented through the valve 74 of each tool. In such an arrangement, when the valves 74 of all of the tools are finally closed, air pressure will then build up in the common chamber 68 to close the control switch 65 and thus simultaneously shut off operating air flow to all of the tools. It is understood in the case of multiple tools, that the inlet passage 58 of each tool would have a separate connection with the supply line 63 or with a common manifold connected to the supply line 63.

The flow through line 69 may be adjusted by means of a suitable feed valve 30 and a pressure regulator 70.

What is claimed is:

1. A two-speed pneumatically powered rotary nut-runner including an output spindle adapted for engagement with a threaded fastener, a first drive shaft carrying a sun gear, planetary gears rotatably carried by the spindle drivingly engaged by the sun gear, a second drive shaft carrying a ring gear in surrounding relation to and in driving engagement with the planetary gears, a first rotary air vane motor having a rotor drivingly connected with the first drive shaft, and a second rotary air vane motor having a rotor fixed to the second drive shaft, wherein a stage of reduction gearing connects the rotor of the first motor with the first drive shaft.

2. A two-speed pneumatically powered nut-runner comprising an output spindle adapted for driving engagement with a threaded fastener, a first drive shaft carrying a sun gear, planetary gears carried by the spindle and drivingly engaged by the sun gear, a second drive shaft coaxial with the first drive shaft and carrying a ring gear arranged in surrounding relation to and in driving engagement with the planetary gears, a main pneumatic rotary vane motor connected to the second drive shaft for delivering to the spindle through the ring gear and planetary gears relatively high speed and low torque, and an auxiliary pneumatic rotary vane motor connected to the first drive shaft for delivering to the spindle through the sun gear and the planetary gears relatively low speed and high torque, and means for causing both motors to operate concurrently.

3. A two-speed pneumatically powered nut-runner as in claim 2, wherein a stage of reduction gear connects the auxiliary motor with a pinion on the first drive shaft.

4. A two-speed pneumatically powered nut-runner as in claim 2, wherein the main motor is adapted to stall upon the spindle offering a predetermined torque resistance less than the torque required to finally set the fastener, and while so stalled the main motor is adapted to exert a torque of a predetermined value upon the ring gear holding it stationary allowing drive to the spindle to continue from the auxiliary motor through the sun gear and planetary gears.

5. A two-speed pneumatically powered nut-runner as in claim 4, wherein the spindle is adapted to stall upon experiencing a predetermined final torque overload corresponding to the value of the torque of the main motor holding the ring gear stationary, and the sun gear and planetary gears are adapted to translate subsequent continued rotation of the first drive shaft by the auxiliary motor into reverse rotation of the ring and main motor.

6. A two-speed pneumatically powered nut-runner comprising a carrier arm spindle, a work socket engageable with a threaded fastener, reduction gearing coupling the spindle with the socket, a first drive shaft carrying a pinion at one end and a sun gear at the other, planetary gears carried by the spindle drivingly engaged by the sun gear, a second drive shaft coaxial with the first drive shaft carrying a ring gear arranged in surrounding relation to and in driving engagement with the planetary gears, an auxiliary motor having an air driven rotor provided with radially slidable vanes and having a rotor shft, reduction gearing coupling the rotor shaft with the pinion of the first drive shaft, a main motor having an air driven rotor unitary with the second drive shaft and provided with radially slidable vanes, the main motor adapted to transmit through the ring gear and planetary gears to the fastener at a certain speed torque of a value less than that required to finally set the fastener, the auxiliary motor adapted to transmit through the reduction gear, sun gear and planetary gears to the fastener at a relatively lower speed torque of a predetermined relatively higher value, an operating air source common to both motors, and passage means connecting the supply source for concurrent operation of both motors.

References Cited
UNITED STATES PATENTS

| | | | |
|---|---|---|---|
| 2,571,172 | 10/1951 | Robin et al. | 74—675 |
| 3,088,335 | 5/1963 | Bullard | 74—675 |
| 3,354,754 | 11/1967 | Amtsberg et al. | 81—52.4 |

FOREIGN PATENTS 808,983  2/1959  Great Britain.

ARTHUR T. McKEON, Primary Examiner

U.S. Cl. X.R.

74—675; 81—57.31

UNITED STATES PATENT OFFICE
CERTIFICATE OF CORRECTION

Patent No. 3,507,173 April 21, 1970

William K. Wallace

It is certified that error appears in the above identified patent and that said Letters Patent are hereby corrected as shown below:

Column 1, line 70, "delivery" should read -- deliver --. Column 3, line 21, "sliadable" should read -- slidable --. Column 6, line 30, "manifiold" should read -- manifold --; line 63, "gear" should read -- gearing --. Column 7, line 6, "ring and main motor" should read -- ring gear and main motor --; line 17, "shft" should read -- shaft --. Column 8, line 2, "gear" should read -- gearing --.

Signed and sealed this 15th day of December 1970.

(SEAL)
Attest:

Edward M. Fletcher, Jr.
Attesting Officer

WILLIAM E. SCHUYLER, JR.
Commissioner of Patents